United States Patent [19]

Cantwell, Jr.

[11] E Patent Number: Re. 32,516

[45] Reissued Date of Patent: Oct. 6, 1987

[54] LOOP SWITCHING SYSTEM

[75] Inventor: Richard F. Cantwell, Jr., Boulder, Colo.

[73] Assignee: American Telephone & Telegraph Co., AT&T Bell Labs, Holmdel, N.J.

[21] Appl. No.: 750,894

[22] Filed: Jul. 1, 1985

Related U.S. Patent Documents

Reissue of:

[64] Patent No.: 4,393,497
Issued: Jul. 12, 1983
Appl. No.: 255,469
Filed: Apr. 20, 1981

[51] Int. Cl.[4] ..... H04J 3/08; H04Q 11/04

[52] U.S. Cl. ..... 370/89; 370/86; 340/825.05

[58] Field of Search ..... 370/89, 86, 88, 79; 340/825.05

[56] References Cited

U.S. PATENT DOCUMENTS

| | | | |
|---|---|---|---|
| 3,655,922 | 4/1972 | Gerke | 179/18 E |
| 3,732,543 | 5/1973 | Rocher et al. | 370/89 |
| 3,879,710 | 4/1975 | Maxemchuk et al. | 370/89 |
| 3,919,484 | 11/1975 | Maxemchuk | 370/86 |
| 4,255,741 | 3/1981 | Peterson | 340/825.05 |
| 4,491,838 | 1/1985 | West | 370/86 |

FOREIGN PATENT DOCUMENTS

| | | | |
|---|---|---|---|
| 0046348 | 4/1981 | Japan | 340/825.05 |

*Primary Examiner*—Douglas W. Olms
*Attorney, Agent, or Firm*—James M. Graziano

[57] ABSTRACT

The loop switching system of this invention overcomes the problems of prior art loop switching systems by providing dynamic rearrangeability of loop switching systems. In particular, the subject loop switching system is comprised of a number of port circuits or nodes serially connected together to form one or more loops. The interconnection of these various ports into one or more loops is implemented on a dynamic basis by means of a central switching matrix.

18 Claims, 10 Drawing Figures

500
DELAY ADJUST
510
OFFSET CALCULATOR
512
FRAME
BEGIN FRAME
513
514
515
7 BIT CNTR
OFFSET
CLK
511
DELAY CIRCUIT
T FF
0
1
READ WRT
DI
128X1
RAM
ADDR
DO
519
518
MUX
READ ADDR
517
ADDER
516
7 BIT CNTR
WRITE ADDR
CLK
SDO-0
DIST SWITCH 100
MASTER FR+2
CLKX2
SET
COMMON CONTROL 101

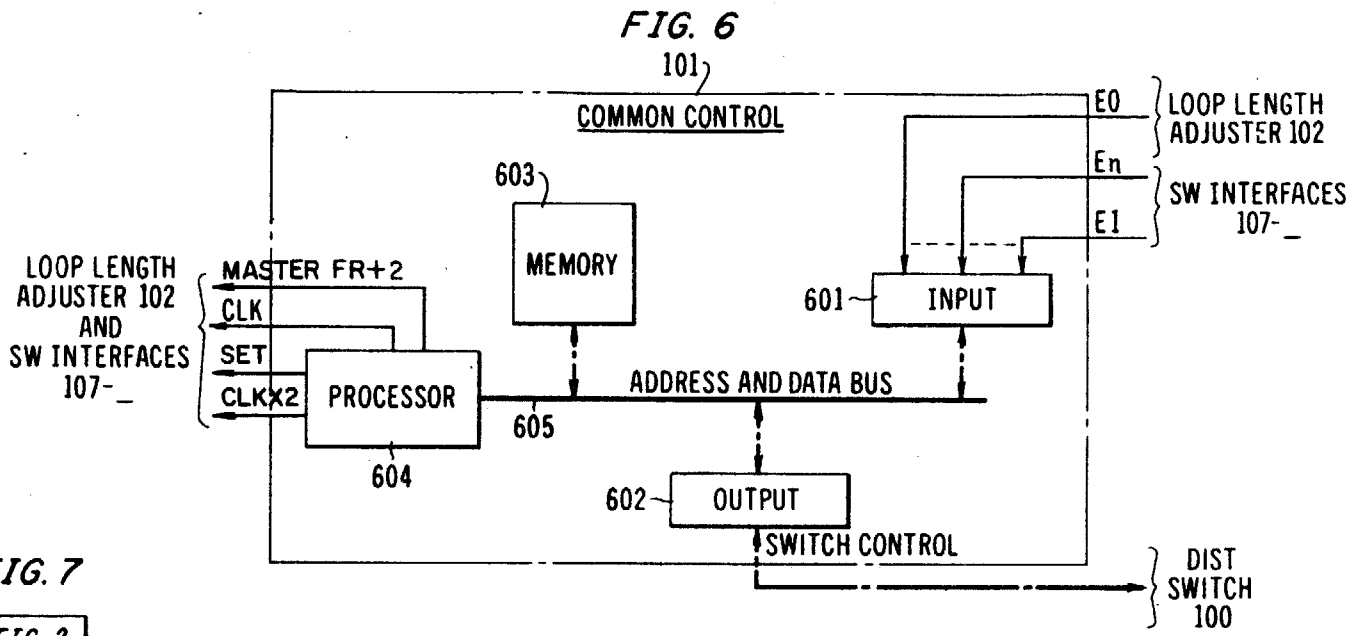
FIG. 6
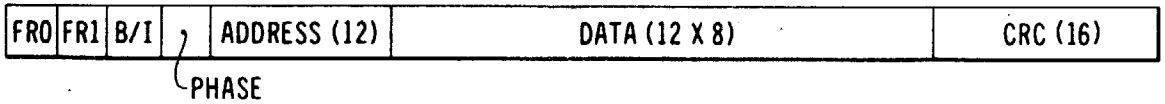
FIG. 9
DATA PACKET
FIG. 7
| FIG. 2 |
|---|
| FIG. 3 |
FIG. 8
| FIG. 4 |
|---|
| FIG. 5 |

LOOP SWITCHING SYSTEM

Matter enclosed in heavy brackets [ ] appears in the original patent but forms no part of this reissue specification; matter printed in italics indicates the additions made by reissue.

FIELD OF THE INVENTION

This invention relates to switching systems and, in particular, to a loop switching system which is comprised of a number of ports serially connected together to form one or more loops. Unlike prior loop systems, the interconnection of these various ports into loops is implemented on a dynamic basis by means of a central switching matrix.

DESCRIPTION OF THE PRIOR ART

Loop switching systems entail the serial interconnection of a number of nodes into a configuration which is generally known as a ringnet. In a ringnet, each node is connected to two other nodes so that the collection of nodes forms a ring. Each node receives bits from one of its two adjacent nodes (the first "upstream" node) and transmits bits to the other adjacent node (the first "downstream" node). This communication subnetwork behaves like a shift register, since the sequence of bits in a data packet are clocked from node to node around the ring with the nodes acting like the successive flip flops in a shift register. During each bit time interval, a node listens to the bit (1 or 0) transmitted from the upstream node and, at the same time, transmits a bit to the downstream node. The bit sent downstream in a bit time interval is either the bit heard from upstream during the preceding interval or is part of a new message originating from the node. Thus, in either case, such node functions to provide one unit of delay in transmitting the data packet around the loop.

Permission to transmit is carried by a special bit pattern in the data packet called a token. When the ringnet is idle this token, usually about 8 bits long, circulates around the ring. If a node has a message to transmit it must wait until the token pattern reaches its tap. When this happens, the node has permission to transmit its message onto the ring by writing into the data packet associated with the token. The node changes the last bit of the token before putting out its message in order to keep downstream nodes from overwriting its message. When it has finished transmitting its message, the node writes a new token onto the ring to indicate that the ringnet is now idle.

Prior art ringnet systems require that each loop must contain a fixed number of ports which are permanently wired together in series fashion. This requirement guarantees a certain fixed cumulative delay time for a message to traverse the loop and simplifies the network control since the system interconnection is totally static. In multiloop systems, each loop also contains a loop termination circuit which functions to interconnect that loop to all other loops for intercommunication purposes. The problem with these prior art loop switching systems is that the inflexibility both in the fixed sequence of node interconnections and also in the fixed size of the loop causes several disadvantages in terms of traffic capabilities and maintainability. In particular, if one node in the loop is inoperable, this would seriously affect the operation of the remaining nodes on the same loop. Additionally, traffic load balance among loops is poor due to the permanent nature of the interconnection of the nodes as well as the inability to vary the size of each loop.

SUMMARY OF THE INVENTION

The loop switching system of this invention overcomes the problems of prior art loop switching systems by providing dynamic rearrangeability of loop switching systems. In particular, the subject loop switching system is comprised of a number of port circuits or nodes serially connected together to form one or more loops. The interconnection of these various ports into one or more loops is implemented on a dynamic basis by means of a central switching matrix. Because each loop is comprised of a series of switching matrix connections, it is possible to reconfigure a loop at any point in time by simply rearranging the switching matrix connections. Uniformity of timing in this environment is obtained by switching in various amounts of delay which are generated by a loop length adjusting circuit. This delay insertion compensates for any variation in the number of ports on a particular loop and permits loops of any length to be constructed. Thus, the central switching matrix of this invention increases the capability and reliability of the switching system by enabling the system control to disconnect a nonworking port while also permitting reconfiguration of the loop to accomplish both loop growth and traffic load balancing.

BRIEF DESCRIPTION OF THE DRAWINGS

FIG. 6 illustrates the common control circuit of FIG. 1 in further detail;

FIG. 7 illustrates the manner in which FIGS. 2 and 3 are interconnected;

FIG. 8 illustrates the manner in which FIGS. 4 and 5 are interconnected;

FIG. 9 illustrates the structure of a typical data packet; and

DETAILED DESCRIPTION, FIG. 1

Figure 1:
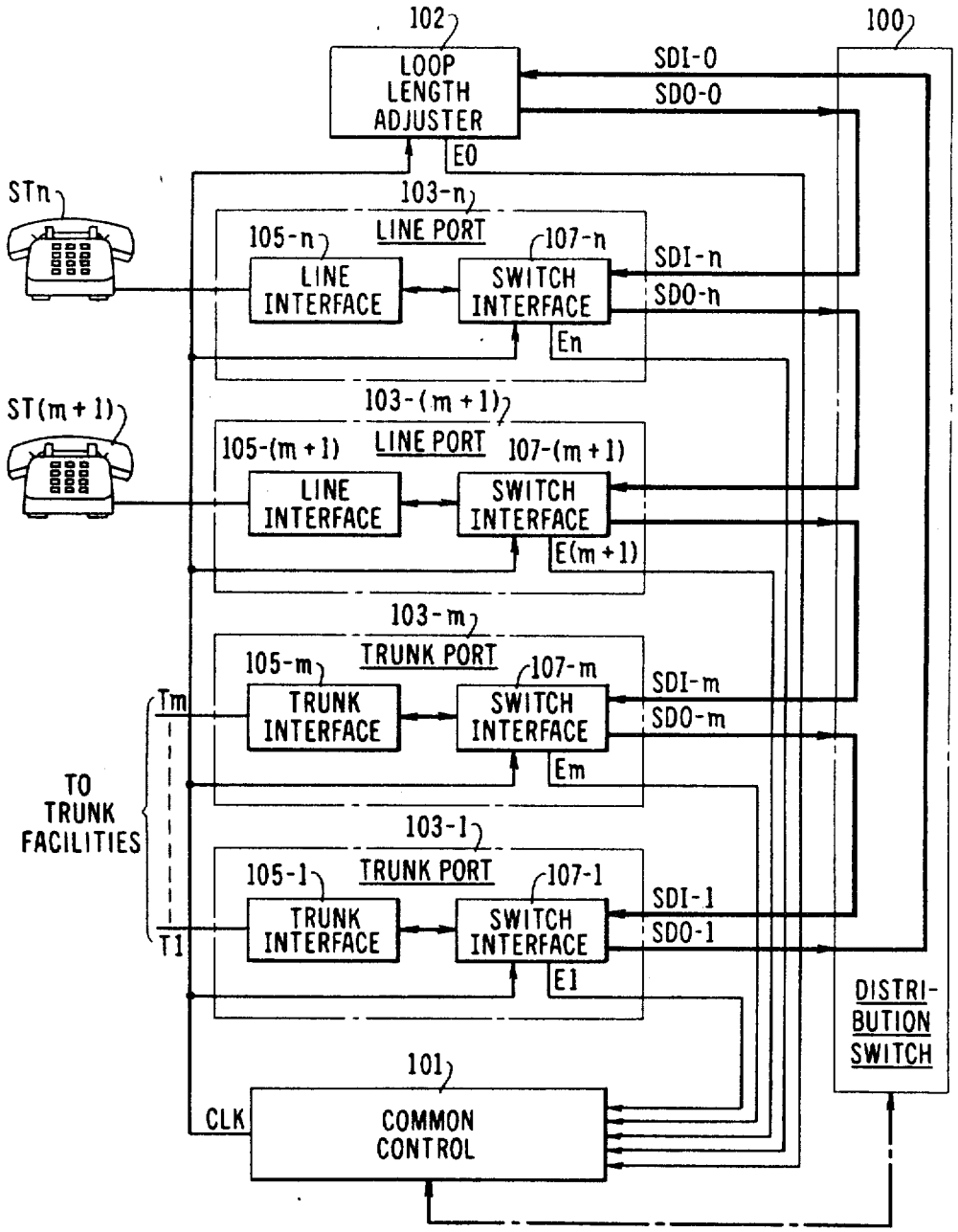
FIG. 1 illustrates the preferred embodiment of a single loop version of the loop switching system of my invention in block diagram form.

FIG. 1 illustrates the general form of the subject loop switching system as embodied in a Pulse Code Modulation (PCM) telecommunication system within which line and trunk ports are interconnected by a central switch matrix to form a closed loop.

This particular configuration is characterized by a typical electronic random-access switch matrix, distribution switch 100, which controls the interconnection of all port circuits (nodes), thereby controlling the structure of the loop. In particular, FIG. 1 depicts the serial communication loop consisting of m trunk ports (103-1 to 103-m), $n-m$ line ports (103-$(m+1)$ to 103-n) and loop length adjuster 102 and shows the relationships among these circuits (which are shown in more detail in FIGS. 2 through 6). Including loop length adjuster 102, a total of $n+1$ circuits are interconnected through the loop. While a plurality of loops can be configured, only one is shown for simplicity of description.

The disclosed telecommunication system is equipped with m trunk ports 103-1 to 103-m, each of which function to interface an associated trunk circuit (not shown) with the central switching matrix, distribution switch 100. A plurality (n−m) of line ports, 103-(m+1) to 103-n, are also provided to similarly interface associated telephone station sets, ST(m+1) to STn, or data terminals with distribution switch 100. Each of port circuits 103-1 to 103-n is equipped with either a trunk interface circuit 105-1 to 105-m or a line interface circuit 105-(m+1) to 105-n which functions to convert the signals emanating from the associated equipment (whether trunk, telephone station set, or data terminal) to the common digital data format which is employed in the subject telecommunication system. Each of these interface circuits 105-1 to 105-n is, in turn, connected to a switch interface circuit 107-1 to 107-n which functions to apply this digital data to the loop formed by distribution switch 100. These port circuits, 103-1 to 103-n, also function to transmit data in the reverse direction, by removing data from the loop, reformatting it and applying it to the associated terminal or trunk equipment.

Each port circuits 103-1 to 103-n is connected into the loop through distribution switch 100, which accepts switching data from a common control circuit 101. This switching data indicates the order of interconnection of loop length adjuster 102 and port circuits 103-1 to 103-n. A pair of serial data lines (labeled SDI-0 and SDO-0) extend from distribution switch 100 to loop length adjuster 102 and an appropriate one of each of the remaining n pair of serial data lines (SDI-i, SIO-i) also extend respectively to each switch interface circuit (103-1 to 103-n) and function to carry data between distribution switch 100 and each switch interface. In particular, serial data line SDI-i is the input lead of port i and is connected by distribution switch 100 to output lead (SDO-(i+1) of the upstream port, port i+1, while serial data line SDO-i is the output lead of port i and is connected by distribution switch 100 to the input lead SDI-(i−1) of downstream port, port (i−1). Thus, distribution switch 100 carries the bit packets to port i on lead SDI-i while the output bit packets from port i are accepted by distribution switch 100 from lead SDO-i. The clock signal from common control circuit 101 is connected via lead CLK to all nodes of the loop (loop length adjuster 102 and port circuits 103-1 to 103-n), and an error line E0–En from each node (loop length adjuster 102, and port circuits 103-1 to 103-n) is connected back to common control circuit 101 for synchronization and control purposes as will be discussed hereinbelow.

Details of distribution switch 100 are not shown in FIG. 1 because it is, in the subject embodiment, an electronic random-access switch matrix such as a PNPN electronic crosspoint matrix. The method of implementing such a switch matrix is well-known in the art and to delve into the details of such a switch in this description is counterproductive, especially since there are a tremendous number of alternative embodiments available. It is left to the circuit engineer to select the most economically viable hardware that is consistent with the remaining circuitry of the subject system. Suffice it to say that distribution switch 100 is so programmed that it will connect the input of any of nodes 102, 103-1 to 103-n to the output of any one other selected node in the system. The pattern of such connections is determined by common control circuit 101 in response to the current loop conditions and to the algorithm programmed into common control circuit 101.

DATA PACKET TRANSMISSION

To better understand the generic operation of this loop switching system, the transmission of a typical 128-bit data packet around the loop will be described. This process is originated when a circuit (described hereinbelow) within loop length adjuster 102 sends out a series of 128-bit data packets on the SDO-0 line, which packets are to be circulated by distribution switch 100 to each port on the loop. Such a packet is shown in FIG. 9 and consists of (in order of occurrence): 2 framing bits, a busy/idle bit, a phase bit, 12 address bits, 96 data bits, and a 16 bit cyclic redundancy check. Distribution switch 100 receives the 128-bit data packet on lead SDO-0 and sends the data packet, bit by bit, to each port circuit 103-1 to 103-n in the network in a preassigned order, which order is expressed in FIG. 1 as a position on the loop. As the packet arrives at the input of a typical port that has data to send, such as trunk port 103-m, a circuit in trunk port circuit 103-m checks the busy/idle and phase bits (the token) to determine if the packet is free. If the packet is free, trunk port circuit 103-m changes the busy/idle bit to indicate that the packet is in use, sets the phase bit to zero to indicate that this is a new packet, overwrites the address section of the packet, overwrites the data section of the packet, calculates an appropriate cyclic redundancy check code, overwrites the old cyclic redundancy check code with the new cyclic redundancy check code, and returns the modified packet to distribution switch 100 on lead SDO-m.

As this packet arrives at the input of the destination port circuit, a decoder in the port circuit examines its address contents to determine whether or not the packet is addressed to the port circuit. If the packet is not addressed to the port circuit, the port circuit simply returns the unmodified packet to the distribution switch after a delay of one bit period. If the packet is addressed to the port circuit, the port circuit converts data received in the packet to an appropriate format (either analog or digital) for the device to which it is connected and this data is sent to the device that the port circuit serves. The port circuit then returns the packet (with the busy/idle bit reset to idle) back to distribution switch 100.

In summary, distribution switch 100 provides a serial interconnection of all n+1 nodes in the system. Each of port circuits 103-1 to 103-n provides one bit time of delay in receiving each bit of the 128-bit data packet and then retransmitting that bit to the subsequent port circuit. Thus, the n port circuits, 103-1 to 103-n, act as an n bit shifter register. Loop length adjuster 102 serves to close the loop between the input and output terminals of this n bit shift register and to add some variable amount of delay to this loop so that the transit time around this loop is equal to some integral number of data packet transmission times (i.e., a multiple of 128-bit times).

ERROR CONTROL

To keep the loop working and delivering only correct data to the associated lines and trunks, error detection circuitry is included in each node of the loop. Two types of errors are detected by loop length adjuster 102 or port circuits 103-1 to 103-n. These are (1) bit errors and (2) loss of continuity around the loop. An error line E0–En from each node (loop length adjuster 102, and port circuits 103-1 to 103-n) is connected back to common control circuit 101. Both aforementioned types of errors are detected and reported on error lines E0–En to common control circuit 101.

COMMON CONTROL

The common control circuit 101 shown in FIG. 6 acts as a maintenance processor. That is, it does not handle call data, but is used to keep continuity around the loop of the subject telecommunications network. Common control circuit 101 typically would be a microprocessor-based controller and functions to recover from transmission errors and to control the operation of distribution switch 100 as will be subsequently described.

There is an error detector circuit within every port circuit which checks for an appropriate cyclic redundancy check code. If the cyclic redundancy check code is incorrect, the detector so reports on the associated error line. The error report remains on the associated error line from the time an error is detected until a packet without error is received. The loop length adjuster detects and reports an incorrect cyclic redundancy check code exactly as does a port, but the loop length adjuster also clears defective packets and calculates a new (correct) cyclic redundancy check code for the idle packets with which it replaces defective packets.

COMMON CONTROL OPERATION

Figure 10:
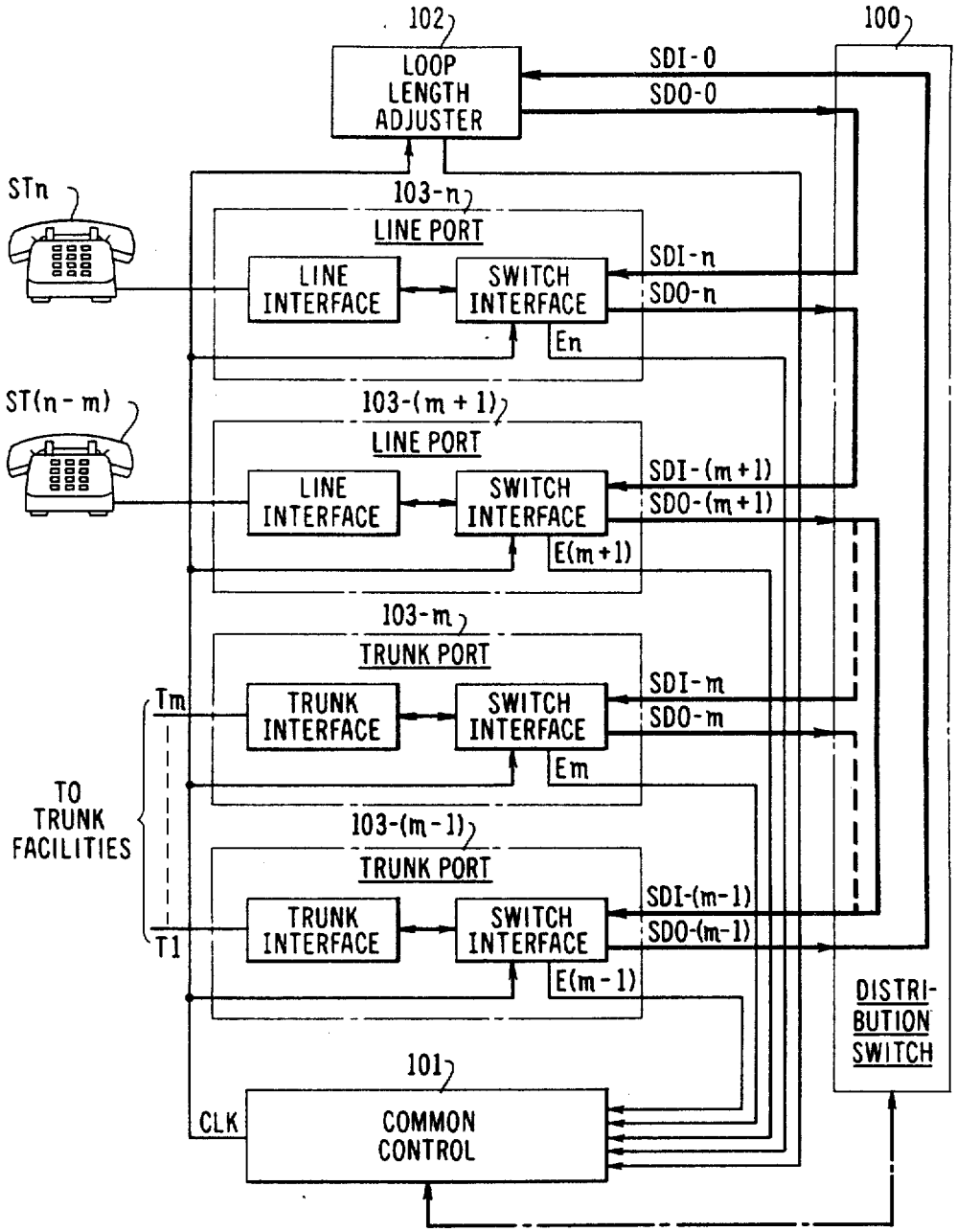
FIG. 10 illustrates the manner in which a nonworking port is switched out of the system.

Observe on FIG. 1, that common control circuit 101 is connected by error lines E0–En to each node (loop length adjuster 102, and port circuits 103-1 to 103-n) of distribution switch 100. Assume now, for the sake of illustration, that the transmission function of trunk port circuit 103-m fails. That being so, common control 101 would receive persistent error signals from port circuits 103-(m−1) to 103-1 (before correction of the cyclic redundancy check code by loop length adjuster 102 so that no error signals come from port circuits 103-n to 103-m). In response to the signals, common control 101 would have been programmed to switch past trunk port circuit 103-m as shown in FIG. 10. Here, the connections to trunk port circuit 103-m (indicated by dotted lines) are shown as having been bypassed by distribution switch 100 thus connecting the output of port circuit 103-(m+1) to port circuit 103-(m+1). This would leave the loop working except for the defective port. So, because of the combination of common control 101 and distribution switch 100, the defective port circuit (103-m) will have been bypassed at computer speed.

LINE OR TRUNK PORT

In the telecommunication system of the preferred embodiment, there are a multitude of equipments which may be served by the trunk port circuits 103-1 to 103-m and line port circuits 103-(m+1) to 103-n. In particular, the trunk circuits connected to the trunk port circuits may be standard analog central office trunks or T1 type digital facilities. Similarly, the line port circuits (103-(m+1) to 103-n may serve: standard analog nonkey station sets ST(m+1) to STn, analog key telephone station sets, digital key telephone station sets, computer terminals, and/or any other such elements. For simplicity of description, these line and trunk facilities will be arbitrarily assumed to be respectively: standard analog nonkey telephone station sets (ST(m+1) to STn) which are served respectively by line port circuits 103-(m+1) to 103-n and standard analog trunk facilities which are served by trunk port circuits 103-1 to 103-m. Thus, trunk interface circuits 105-1 to 105-m might be standard coder/decoder circuits for converting between the analog signals of the trunk facility environment and the digital signals of the subject telecommunication system. Similarly, line interface circuits 105-(m+1) to 105-n would be the appropriate well-known line circuits, performing a like function. For the purpose of this description, assume that a standard format digital data signal is transferred between switch interface circuit 107-1 to 107-n and the associated well-known line/trunk interface circuits 105-1 to 105-n. Thus, since the two types of port circuits shown on FIG. 1 are similar in structure in the subject embodiment and the details of the line interface circuits and the trunk interface circuits are well-known in the art, only the details of switch interface circuits 107-1 to 107-n need be described herein.

TRUNK INTERFACE

Refer now to FIG. 1 to find trunk interface circuit 105-m. Trunk interface circuit 105-m is a conventional circuit of a type long known to the art. Its only function is to translate between analog and digital information or between two types of digital information if a digital trunk were connected thereto. Trunk interface circuit 105-m accepts a data word from switch interface circuit 107-m, interprets the word as a binary number, and converts it, in the subject embodiment, into a dc level proportional to its value for transmission to the associated analog trunk facilities. Trunk interface circuit 105-m also isolates dc levels from analog waveforms sent by the associated analog trunk facilities, quantifies the dc levels, inserts two framing pulses before the resulting binary number, and sends the resulting data word to switch interface circuit 107-m. (Circuits that receive the framing pulses after switch interface circuit 107-m interpret them as busy/idle and phase bits because of their position in the data packet.)

Figure 2:
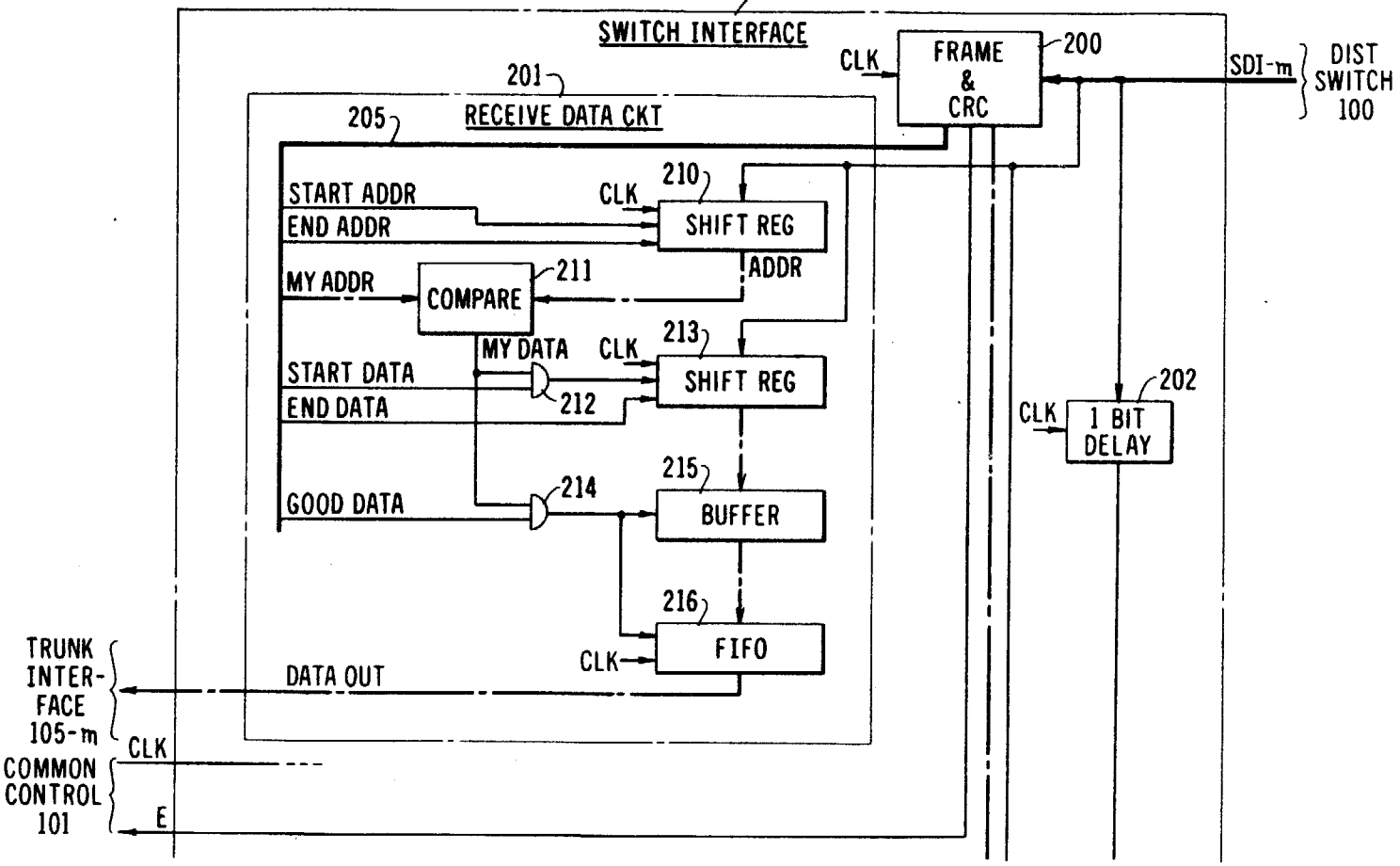
FIGS. 2 and 3 illustrate the switch interface circuit of FIG. 1 in further detail.
Figure 3:
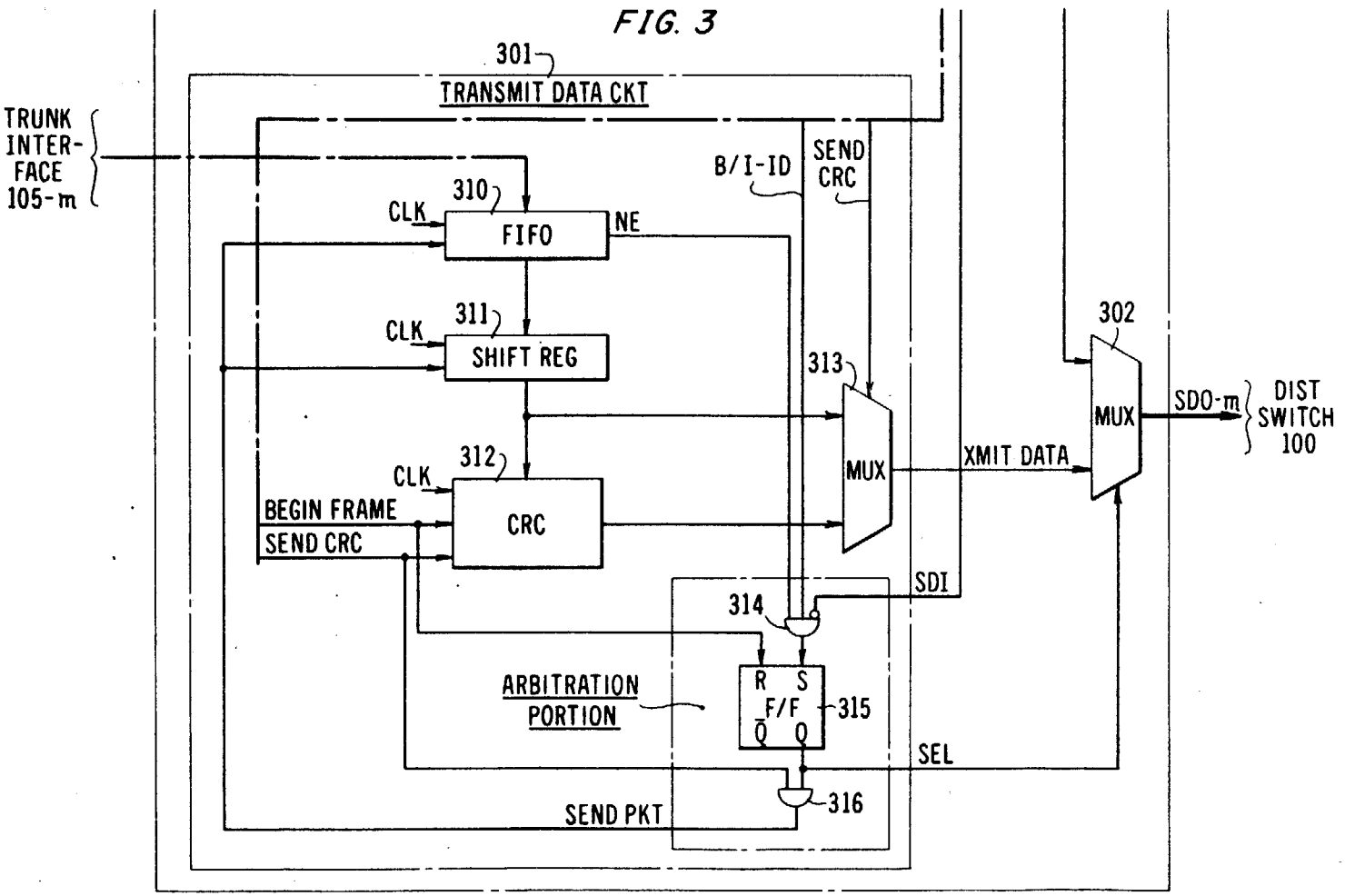

FIGS. 2 and 3 are a diagram of switch interface circuit 107-m which serves trunk port circuit 103-m. The 128-bit data packet from loop length compensation circuit 102 which was described earilier, enters the switch interface circuit on the SDI-m lead. (The data packet having been carried by distribution switch 100.) At this point in the process any one of three things can happen, depending on the states of the data packet and trunk port circuit 103-m associated with switch interface circuit 107-m. First, if the data packet is addressed to the subject trunk port circuit 103-m, the data from the data packet is sent via the Data Out line to trunk interface circuit 105-m (not shown) where it is converted by conventional means into an analog signal for transmission over the associated analog trunk facilities. Second, if the data packet has no information for any port circuit (i.e., is idle) and if the subject trunk port circuit 103-m has data to transmit (from interface circuit 105-m), the subject switch interface circuit 107-m fills the packet thus: it changes the busy/idle and phase bits to 1, changes the address to that of the destination port circuit, changes the data to that provided via the interface input line, and changes the cyclic redundancy check code to one appropriate to the new data packet contents. Third, if the data packet is not addressed to the subject trunk port circuit 103-m or if the data packet is idle and the subject trunk port circuit 103-m has no data to transmit, trunk port circuit 103-m merely retransmits the unaltered data packet on lead SDO-m delayed by one bit time.

Circuits in the switch interface circuit respond to the aforementioned three events as described above based upon the following nine signals from frame and cyclic redundancy check circuit 200: 1. A "Start Address" pulse. 2. An "End Address" pulse. 3. A "My Address" byte. 4. A "Start Data" pulse. 5. An "End Data" pulse. 6. A "Good Data" gate signal. 7. A "Busy/Idle Identification" bit. 8. A "Begin Frame" pulse. 9. A "Send Cyclic Redundancy Check Code" gate. (An error signal, E, is also generated by frame and cyclic redundancy check code circuit 200 for common control circuit 101.)

RECEIVE DATA CIRCUIT

The data packet which is received bit by bit by switch interface 107-m on lead SDI-m, is input to one bit delay circuit 202 where the data packet is delayed one bit time before being transmitted to multiplexer 302. If switch interface circuit 107-m has data to transmit and the received data packet is idle, multiplexer 302 will block the delayed data packet received from one bit delay 202 and instead transmit a new data packet to distribution switch 100 as will be described hereinbelow. Otherwise, multiplexer 302 couples the delayed data packet to distribution switch 100 via lead SDO-m.

The received data packet is also coupled by lead SDI-m to frame and cyclic redundancy check circuit 200. This circuit is a well-known serial communication channel interface arrangement which extracts framing and control information from the header portion of the received data message. This circuit also generates a cyclic redundancy check code and compares this code to that appearing at the end of the data message for error detection purposes. These functions are standard serial communication channel interface operations and suffice it to say that this circuit provides all the control signals necessary to receive the data message as described below.

As the address byte from the aforementioned 128-bit data packet enters the frame and cyclic redundancy check circuit 200 and receive data circuit 201 of switch interface circuit 107-m, frame and cyclic redundancy check circuit 200 generates a start address pulse which is carried by lead START ADDR of control bus 205 to shift register 210. The start address pulse enables shift register 210 to accept the address byte from the 128-bit data packet which arrives from distribution switch 100 on lead SDI-m. At the end of the address byte portion of the 128-bit data packet, frame and cyclic redundancy check circuit 200 generates at end address pulse on lead END ADDR of control bus 205 to close shift register 210.

Now that the address byte of the 128-bit data packet is received and stored in shift register 210, it must be decoded to determine if this data packet is addressed to the subject trunk port circuit 103-m. This is accomplished by frame and cyclic redundancy check circuit 200 activating shift register 210 via leads START ADDR and END ADDR to cause shift register 210 to output the address byte via leads ADDR to comparator 211. The address of the subject trunk port circuit 103-m is also sent by frame and cyclic redundancy check circuit 200 via leads MY ADDR of data bus 205 to data comparator 211. If the addresses match, that is, if the data packet at hand is addressed to the subject trunk port circuit 103-m, comparator 211 generates an output signal on lead MYDATA, which enables receive data circuit 201 to receive the remainder of the data packet.

The enable signal on lead MYDATA enables a start data pulse on lead START DATA from frame and cyclic redundancy check circuit 200 to be passed by gate 212 to shift register 213. This enables shift register 213 to start accepting the data portion of the 128-bit data packet which appears on lead SDI-m. At the end of the data word from the SDI-m line, an end data pulse is placed on lead END DATA by frame and cyclic redundancy check circuit 200, which signal turns off the input of shift register 213. The data word is now stored in shift register 213 where it remains until the cyclic redundancy check code byte of the data packet from the SDI-m line is compared against the other contents of the data packet. If the contents of the cyclic redundancy check byte indicate that the data in the packet are accurate, frame and cyclic redundancy check circuit 200 generates an enable signal on lead GOOD DATA, which signal is passed by gate 214, to enable both buffer 215 and FIFO 216. Buffer 215 and FIFO 216 operate cooperatively to accept the data portion of the 128-bit data packet as it is shifted out of shift register 213 and place this data on lead DATA OUT, which lead is connected to the associated trunk interface circuit 105-m. Thus, the address of the packet was isolated in shift register 210 and confirmed to be a local address by comparator 211, then the data (validated by frame and cyclic redundancy check circuit 200) are passed by shift register 213, buffer 215 and FIFO 216 via the DATA OUT lead to the trunk interface 105-m.

TRANSMIT DATA CIRCUIT

If trunk interface circuit 105-m has data to transmit, it sends the data via transmit data circuit 301, which inserts the data into the next empty data packet which appears on lead SDO-m. The decision to transmit depends on the state of three signals at the input of gate 314, these are: a FIFO-not-empty signal on lead NE, a busy/idle identification signal on lead B/I-ID, and bit packet input on lead SDI-m.

The FIFO-Not-Empty bit on lead NE is high if there are data in FIFO 310, that is, if data from the trunk interface 105-m have been stored in FIFO 310. The busy/idle-ID bit on lead B/I-ID is high when a low busy/idle bit is present on the SDI-m line indicating the presence of an idle data packet. Besides these bits, gate 314 responds to a low signal on lead SDI-m. So if the busy/idle bit is low (idle) when there are data in FIFO 310, gate 314 applies a high level signal to the S input of flip-flop 315 causing flip-flop 315 to be 'set'. The 'set' flip-flop 315 switches multiplexer 302 (via the SEL line) causing it to accept input from transmit data circuit 301 rather than from one bit delay circuit 202 as was previously described.

As you can see in FIG. 9, the first three bits in a packet are the framing bits and the busy/idle bit. Although the gated busy/idle bit causes flip-flop 315 to switch multiplexer 302, it does not pass through the multiplexer (which is switched before the busy/idle bit can pass through one-bit-delay circuit 202). So the only bits from the original packet that are output by multiplexer 302 on the SDO-m lead are framing bits FR0 and FR1.

Besides switching multiplexer 302, a high signal on lead SEL is combined by gate 316 with the normally low signal on lead SEND CRC to form a high signal on lead SEND PKT. The SEND PKT signal, in turn, enables FIFO 310 and shift register 311 to send new data from trunk interface circuit 105-m to distribution switch 100 (both shown on FIG. 1) by way of multiplexers 313 and 302. In order of transmission, the data include: a high busy/idle bit, a high phase bit, 12 bits of address, and 96 bits of data to be delivered to the specified address. (These data complete the packet to be delivered except for a cyclic redundancy check code byte which will next be described.)

As each bit leaves shift register 311, it is read by cyclic redundancy check code circuit 312 via the connection shown to shift register 311. As the bits are read, a new cyclic redundancy check code (for the data transmitted) is calculated by cyclic redundancy check code circuit 312. At the end of the data word from shift register 311 frame and cyclic redundancy check code circuit 200 applies a send cyclic redundancy check code command (high signal) on lead SEND CRC. This signal does three things: it switches multiplexer 313 to accept input from cyclic redundancy check code circuit 312, it enables this circuit to transmit, and it disables FIFO 310 and shift register 311 by means of gate 316. These actions enable the cyclic redundancy check code byte to be transmitted via multiplexer 302 and line SDO-m to distribution switch 100 (on FIG. 1). Flip-flop 315 is reset at the beginning of the next packet by a high signal from frame and cyclic redundancy check code circuit 200 on lead BEGIN FRAME.

LOOP LENGTH ADJUSTER

Figure 4:
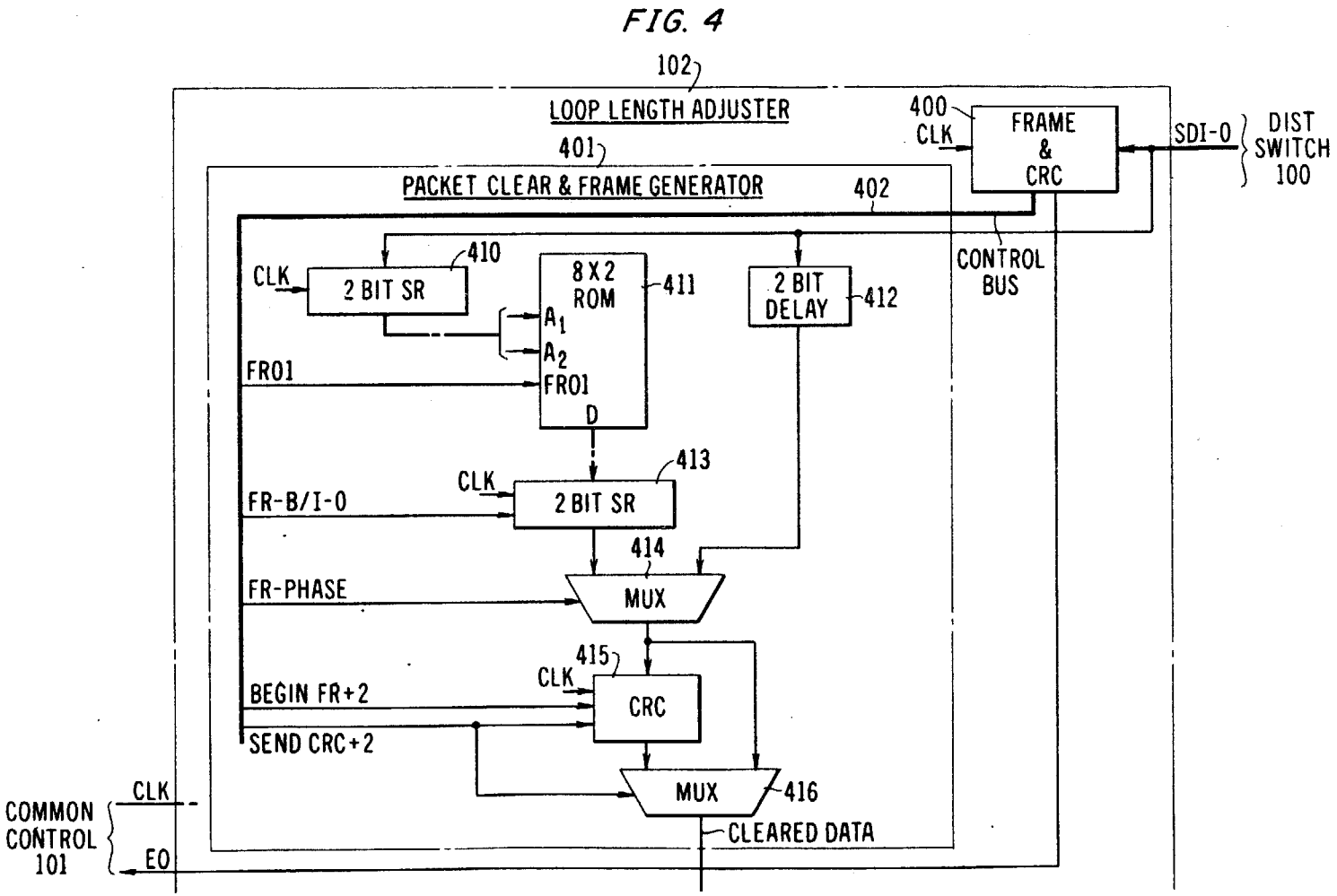
FIGS. 4 and 5 illustrate the loop length adjuster circuit of FIG. 1 in further detail.
Figure 5:
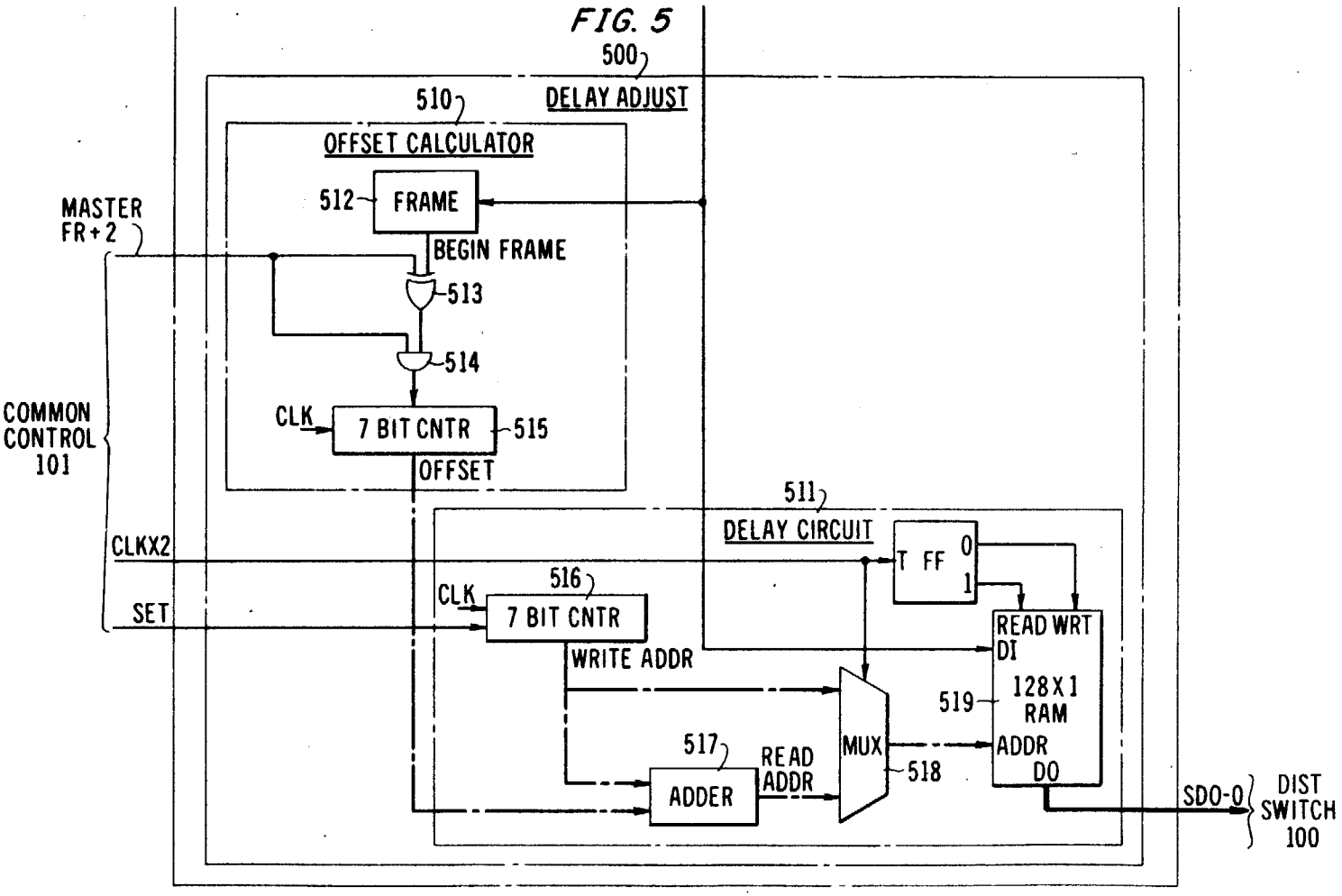

FIGS. 4 and 5 are a diagram of the loop length adjuster circuit (102 in FIG. 1). The loop length adjuster comprises three subassemblies, a frame and cyclic redundancy check code circuit 400 much like that in the switch interface circuits, a packet clear and frame generator circuit 401, and a delay adjust circuit 500.

The 128-bit data packet described earlier enters loop length adjuster on the SDI-0 lead. (The packet having been sent by distribution switch 100.) At this point in the process, depending on the state of the packet, any one of three things can happen. First, if the packet has valid data for a port in the system (i.e., is full), the loop length adjuster retransmits it with only the phase bit and the cyclic redundancy check code changed to indicate that it has been checked by loop length adjuster 102. Second, if the packet is returned having been read by a port (i.e., is used), loop length adjuster 102 changes it to an empty packet (that can be written by any port) by clearing the busy/idle bit (and changing the cyclic redundancy check code). Third, if the packet is empty, the loop length adjuster 102 retransmits it with only the phase bit and the cyclic redundancy check code changed to indicate that it has been checked by loop length adjuster 102.

In all cases, loop length adjuster 102 toggles the framing bits (FR1, FR2 in FIG. 9) so that what was 01 becomes 10 and vice versa. In all cases too, loop length adjuster 102 measures and, if necessary, adjusts the time between packets so that a packet leaves it as a new packet arrives making an integral number of packet-periods around the loop.

PACKET CLEAR AND FRAME GENERATOR

Packet clear and frame generator 401 (shown in FIG. 4) recognizes three conditions of a packet presented to its input. These are: empty packet (characterized by a zero busy/idle bit), full packet (characterized by a one busy/idle and phase bits), and used packet (characterized by a one busy/idle bit and a zero phase bit). In response to the first four bits of the packet, frame and cyclic redundancy check code circuit 400 sends these three signals on control bus 402: 1. a high signal on lead FR01 that persists while the FR1 bit of the data packet is input, 2. a high signal on lead FR-B/I-0 that is generated as the FR1 bit and the phase bit of the data packet are input, 3. a high signal on lead FR-PHASE which signal appears while the first four bits of the 128-bit packet are output. Frame and cyclic redundancy check circuit 400 sends another signal that affects packet clear and frame generator 401, this is high signal on lead SEND CRC+2 which persists while the CRC is output.

A data packet received at the SDI-0 lead from distribution switch 100 (see FIG. 1) is conducted to frame and cyclic redundancy check code circuit 400, 2 bit delay circuit 412, and 2 bit shift register 410. Shift register 410 accepts 2 bits at a time and sends the bits in parallel to ROM 411 as the second bit is received. If these two received bits are the framing bits of the data packet, the signal on lead FR01 will be high as the FR1 bit of the data packet arrives on lead SDI-0, and ROM 411 will simply invert both bits. ROM 411 will treat any other pair of bits thus: if the input is 11, 10 will be sent out and for any other input, 00 will be the output. Bits are output in pairs from ROM 411 to shift register 413 as the signal on lead FR-B/I-O lead goes high, that is, one count after the FR1 and feed bits of the data packet enter frame and cyclic redundancy check code circuit 400 on the SDI-0 line. So, two counts after these bits enter loop length adjuster 102 on the SDI-0 line, the altered framing, busy/idle, and phase bits of the data packet arrive at one input of multiplexer 414.

At the other input of multiplexer 414, the unaltered data packet arrives delayed by 2-bit delay circuit 412. The signal from frame and cyclic redundancy check code circuit 400 on lead FR-PHASE is high while the delayed framing, busy/idle and phase bits of the data packet are input to multiplexer 414, which circuit passes these bits through multiplexer 416 to lead CLEARED DATA. Frame and cyclic redundancy check code circuit 400 returns the signal on lead FR-PHASE to low once the phase bit of the data packet is transmitted and the multiplexer 414 sends data from 2-bit delay circuit 412 to multiplexer 416. As it receives the packet thus assembled, cyclic redundancy check code circuit 415 calculates an appropriate cyclic redundancy check code. Then, having been so gated by the high signal from frame and cyclic redundancy check code circuit 400 on lead SEND CRC+2, it sends the resulting cyclic redundancy check code to multiplexer 416. The signal on lead SEND CRC+2 is high for the 16-bit period of the cyclic redundancy check code, and is delayed by two counts from the input cyclic redundancy check code to account for the delay ahead of CRC circuit 415. Besides making cyclic redundancy check code circuit 415 send the CRC byte just calculated, the high signal on lead SEND CRC+2 switches multiplexer 416 from multiplexer 414 to cyclic redundancy check code circuit 415 so that the CLEARED DATA output carries the new cyclic redundancy check code.

Thus, from the SDI-0 input and from the control signals applied by frame and cyclic redundancy check code circuit 400 to data bus 402, packet clear and frame generator 401 produces a data packet that differs from the original in that the framing bits are inverted, the busy/idle or phase bits are cleared if necessary, and an appropriate cyclic redundancy check code is included.

DELAY ADJUST

If the subject system is to work at maximum efficiency, there must be an integral number of packets circulating in the loop. That is, circuit delays and delays in the conductors from circuit to circuit must be such that a packet enters the loop length adjuster exactly as a packet exits. Delay adjust circuit 500 is included to fulfill this function. Delay adjust circuit, 500, is composed of two circuits, offset calculator 510 and delay circuit 511.

OFFSET CALCULATOR

In response to a difference between the beginning of the exiting packet at lead SDO-0 and the pulse MASTER FR+2 from common control circuit 101, 7-bit counter 515 increments a 7-bit number stored therein which number is outputted in parallel form on bus OFFSET. Frame circuit 512 is a standard frame detector circuit which monitors lead CLEARED DATA and emits an on lead BEGIN FRAME pulse at the start of each packet which was input to loop length adjuster 102 on the SDO-0 line. Gates 513 and 514 accept this BEGIN FRAME signal and the MASTER FR+2 pulse and if the latter occurs in the absence of the former, send a pulse that increments 7-bit counter 515 (the two gates having the effect of an AND gate with one inverted input). Counter 515 accumulates bits from gate 514 and sends the number of bits so accumulated as a 7-bit binary number (modulo 128) on bus OFFSET to delay circuit 511.

DELAY CIRCUIT

Delay circuit 511 functions to adjust the timing of data packets which are being transmitted around the loop. This is accomplished by storing each bit of data that is received on lead SDI-0 from distribution switch 100 in RAM 519 and retransmitting this data on lead SDO-0 after a delay of an integral number of bit times as determined by offset calculator circuit 510. Common control 101 begins this process by initializing 7-bit counter 516 via lead SET when the subject system is first turned on. Counter 516 is a free running counter which is incremented by a clock pulse on lead CLK once every bit time. The output of counter 516 is then a 7-bit address (on bus WRITE ADDR) which is used by multiplexer 518 to activate the memory location in RAM 519 wherein the current bit of data is to be stored.

However, there are always two 7-bit addresses at the inputs of multiplexer 518. There are an address wherein data is to be read and an address wherein data is to be written, and the busses are named READ ADDR and WRITE ADDR respectively. As just discussed, 7-bit counter 516 originates the address wherein the data is written by incrementing the binary number currently stored therein by one for each pulse from the clock on lead CLK. The address thus generated is input to RAM 519 by multiplexer 518 between clock pulses (the switching signal to multiplexer 518 being twice the rate of the clock, which signal appears on lead CLK×2). The next pulse from lead CLK×2 causes multiplexer 518 to switch, thereby entering an address wherein data is to be read from RAM 519 onto lead SDO-0. The address appearing on bus READ ADDR is generated by adding (modulo 128) the 7-bit number generated by offset calculator 510 and which appears on bus OFFSET with the 7-bit number generated by 7-bit counter 516 and which appears on bus WRITE ADDR. Adder 517 accomplishes this addition and the offset number appearing on bus OFFSET is recalculated at the beginning of each data packet. If the incoming and outgoing frames were to occur at the same time, the contents of the OFFSET bus would equal zero and adder 517 would yield the same number as the write address plus one (the write address having been incremented by the clock pulse). If this were the case, the address just written would be read upon the next CLK×2 pulse. If, however, the incoming and outgoing packets were not to start together, the number at OFFSET would represent the number of bit times that must be absorbed by loop length adjuster 102 to provide a loop of integral number of 128-bit data packets.

ERROR CONTROL

Input circuit 601 of common control 101 reads signals on the error lines (E0–En in FIGS. 1 and 6), one error line from each port and one from loop length adjuster circuit 102. Error signals are identified by the line on which they arrive so error signal addresses can be stored in memory 603 for analysis. When an error signal arrives on one of the error lines, input circuit 601 generates an interrupt signal which is sent to processor 604. Processor 604 responds to this interrupt signal in well-known fashion and reads the source address of the activated error line/lines from input circuit 601 to the appropriate location in common control memory 603 via address and data bus 605.

Having thus received notice of error signals, processor 604 compares the pattern of the error signals to the sequence of loop nodes contained in memory 603. In the preferred embodiment, processor 604 is programmed to test by temporarily removing from the loop the loop node preceding that which sent the first error signal, then to test the one which sent the first error signal, and so on until the nonworking port circuit is located. A typical loop reconfiguration is depicted in FIG. 10. Assume, for the sake of illustration, that trunk port 103-m of FIG. 10 is defective in such a way that it both generates erroneous signals and impairs the transmission of data packets while relaying them. Error signals then are sent to common control 101 on lines Em through E1 as each distorted data packet passes through the nodes associated with these lines. The first time such a set of error signals is received by common control circuit 101, it is treated as a transient error and so logged. If the error signals are persistent, however, common control circuit 101 instructs distribution switch 100 to bypass port circuit 103-(m+1) since port circuit 103-(m+1) immediately precedes the source of the first error signal, port circuit 103-m. In this example trunk port circuit 103-m is defective, so such action will not clear the error indication. Thus, common control circuit 101 will continue to receive the given set of error signals. This being the case, common control 101 instructs distribution switch 100 to reintroduce port circuit 103-(m+1) to the loop and bypass trunk port circuit 103-m resulting in the configuration shown in FIG. 10. Since the defective port circuit (103-m) is switched out, subsequent packets will circulate through the loop without generating error signals. So upon the sacrifice of trunk port circuit 103-m, the rest of the system is enabled and data packets will continue to be transmitted while trunk port circuit 103-m is repaired. Meanwhile, processor 604 (see FIG. 6) changes the transient error report stored in memory 603 (as described earlier in this text) into a hardware failure report and loop length adjuster 102 adds one bit time of delay to the transmission of packets to compensate for the loss of one trunk port circuit.

Thus, the above description illustrates how the subject loop switching system functions to provide the interconnection of the various port circuits. It is obvious that common control circuit 101 can reconfigure the loop at any time by having distribution switch 100 rearrange the interconnections of the various port circuits. While a multiple loop system has not been disclosed, it is a simple extension of the single loop system described above. In particular, by interconnecting two port circuits together to form an "interloop" trunk, data messages can then be transmitted between loops in a fashion that is totally transparent to a user on the system.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. A communication system for serially interconnecting n communication circuits (T1–Tm, ST(n−m)–Stn) comprising:

n port means (103-1 to 103-n), each having an input (SDI-i) and an output terminal (SDO-i), associated on a one-to-one basis with said n communication circuits (T1–Tm, ST(n−m)–STn) for interfacing said n communication circuits (T1–Tn, ST(n−m)–STn) to said communication system;

control means (101) for establishing an order of interconnection for all of said n port means; and interconnection means (100) connected to said input (SDI-i) and said output (SDO-i) terminals of all of said n port means (103-1 to 103-n) and responsive to said control means (101) for carrying data messages from said output terminal (SDO-(m+1)) of the (m+1)th port means (103-(m+1)) to said input terminal (SDI-m) of the m th port means (103-m) for all n said port means (103-1 to 103-n) according to said order of interconnection.

2. The invention of claim 1 wherein said communication system includes loop length adjusting means (102) connected to said interconnection means (100) for delaying the transmission of said data messages among said n port means (103-1 to 103-n) by a length of time sufficient to make the data message transit time through all said n port means (103-1 to 103-n) equal to a predetermined time.

3. The invention of claim 2 wherein said loop length adjusting means (102) has input (SDI-0) and output (SDO-0) terminals connected to said interconnection means (100); and wherein said interconnection means (100) carries each data message from the output terminal (SDO-1) of a selected first port means (103-1) to said input terminal (SDI-0) of said loop length adjusting means (102) wherein said data message is delayed before being outputted by said loop length adjusting means (102) on said output terminal (SDO-0); and wherein said interconnection means (100) carries each of said delayed data messages from said loop length adjusting means (102) output terminal (SDO-0) to the input terminal (SDI-n) of a second selected port means (103-n).

4. The invention of claim 3 wherein said loop length adjusting means (102) includes offset calculator means (510) responsive to said control means (101) and the receipt of said data message for dynamically generating an offset signal which is indicative of the length of time said data message must be delayed to make the data message transit time through all said n port means (103-1 to 103-n) equal to said predetermined time.

5. The invention of claim 4 wherein said loop length adjusting means (102) includes delay means (511) responsive to said offset signal for delaying the outputting of said data signal on said loop length adjusting means (102) output terminal (SDO-0) by said length of time represented by said offset signal.

6. A communication system for serially interconnecting n communication circuits (T1–Tm, ST(n−m)–STn) comprising:

n port means (103-1 to 103n), each having an input (SDI-i) and an output terminal (SDO-i), associated on a one-to-one basis with said n communication circuits (T1–Tm, ST(n−m)–STn) for interfacing said n communication circuits (T1–Tm, ST(n−m)–STn) to said communication system;

control means (101) for establishing an order of interconnection for all of said n port means (103-1 to 103-n);

interconnection means (100) connected to said input (SDI-i) and said output (SDO-i) terminals of all of said n port means (103-1 to 103n) and responsive to said control means (101) for carrying data messages from said output terminal (SDO-(m+1)) of the (m+1) th port means (103(m+1)) to said input terminal SDI-(m) of the m th port means (103-m) for all said n port means (103-1 to 103-n) according to said order of interconnection;

clock means (604) connected to each of said n port means (103-1 to 103-n) for generating control and timing signals to define time slot intervals; and wherein each of said n port means (103-(m+1)) is responsive to said control and timing signals for transmitting a single bit of said data message to the subsequent one of said n port means (103-m) via said interconnection means (100) during each of said time slot intervals.

7. The invention of claim 6 wherein said communication system includes loop length adjusting means (102) connected to said interconnection means (100) for delaying the transmission of said data messages among said n port means (103-1 to 103-n) by an integral number of said time slot intervals.

8. The invention of claim 7 wherein said integral number of time slot intervals is equal to k times the data message repetition rate less n+1 times said time slot interval wherein k is the integer which represents the least number of data messages required to exceed n+1 times said time slot interval.

9. The invention of claim 8 wherein said loop length adjusting means (102) are responsive to said control means (101) for dynamically determining said integral number of time slot intervals.

10. The invention of claim 9 wherein said loop length adjusting means (102) has input (SDI-0) and output (SDO-0) terminals connected to said interconnection means (100); and wherein said interconnection means (100) carries each data message from the output terminal (SDI-1) of a first port means (103-1) to said input terminal (SDI-0) of said loop length adjusting means (102) wherein said data message is delayed said integral number of time slot intervals before being outputted by said loop length adjusting means (102) on said output terminal (SDO-0); and wherein said interconnection means (100) carries each of said delayed data messages from said loop length adjusting means (102) output terminal (SDO-0) to the input terminal (SDI-n) of a second port means (103-n).

11. The invention of claim 10 wherein said loop length adjusting means (102) includes offset calculator means (510) responsive to said control means (101) and the receipt of said data message for dynamically generating an offset signal which is indicative of said integral number of time slot intervals.

12. The invention of claim 11 wherein said loop length adjusting means (102) includes delay means (511) responsive to said offset signal for delaying the outputting of said data signal on said loop length adjusting means (102) output terminal (SDO-0) by said integral number of time slot intervals represented by said offset signal.

13. The invention of claims 2 or 7 wherein each of said n port means (103-m) includes error checking means (200) connected to said control means (101) and responsive to the receipt of a data message containing a transmission error on said input terminal (SDI-m) of said port means (103-m) for transmitting an error signal to said control means (101).

14. The invention of claim 13 wherein said control means (101) is responsive to the receipt of a persistent error signal from one or more of said n port means (103-1 to 103-n) for identifying the disabled one of said n port means (103-m) that is the source of said transmission error and for removing said disabled port means (103-m) from said order of interconnection.

15. The invention of claims 1 or 6 wherein said interconnection means (100) comprises a PNPN electronic crosspoint matrix.

*16. A loop communication system comprising:*

*n terminal devices (T1, 103-1 to Tn, 103-n), each having an input (SDI-i) and an output (SDO-i) terminal;*

*control means (101) for establishing an order of interconnection for a plurality of said terminal devices (T1, 103-1 to Tn, 103-n);*

*interconnection means (100) connected to said input (SDI-i) and said output (SDO-i) terminals of all of said terminal devices (T1, 103-1 to Tn, 103-n) and responsive to said control means (101) for carrying data messages from said output terminal (SDO-(m+1)) of the (m+1)th terminal device (Tm, 103-m) to said input terminal (SDI-m) of the mth terminal device (Tm, 103-m) according to said order of interconnection.*

*17. The system of claim 16 additionally comprising:*

*error checking means (200) connected to said control means (101) and responsive to an erroneous data message transmission between two of said plurality of terminal devices for transmitting an error signal to said control means (101).*

*18. The system of claim 17 wherein said control means (101) is responsive to said error signal for modifying said order of interconnection to exclude the ones of said plurality of terminal devices transmitting erroneous data messages.*

* * * * *